No. 898,302. PATENTED SEPT. 8, 1908.
R. BAGGALEY.
SLAG HEATED BOILER.
APPLICATION FILED APR. 19, 1904.

2 SHEETS—SHEET 1.

WITNESSES
INVENTOR
Ralph Baggaley

No. 898,302.

PATENTED SEPT. 8, 1908.

R. BAGGALEY.

SLAG HEATED BOILER.

APPLICATION FILED APR. 19, 1904.

2 SHEETS—SHEET 2.

WITNESSES

INVENTOR

UNITED STATES PATENT OFFICE.

RALPH BAGGALEY, OF PITTSBURG, PENNSYLVANIA.

SLAG-HEATED BOILER.

No. 898,302.      Specification of Letters Patent.      Patented Sept. 8, 1908.

Application filed April 19, 1904. Serial No. 203,884.

*To all whom it may concern:*

Be it known that I, RALPH BAGGALEY, of Pittsburg, in the county of Allegheny and State of Pennsylvania, have invented a Slag-Heated Boiler, of which the following is a description, reference being had to the accompanying drawings, in which—

Figure 1:
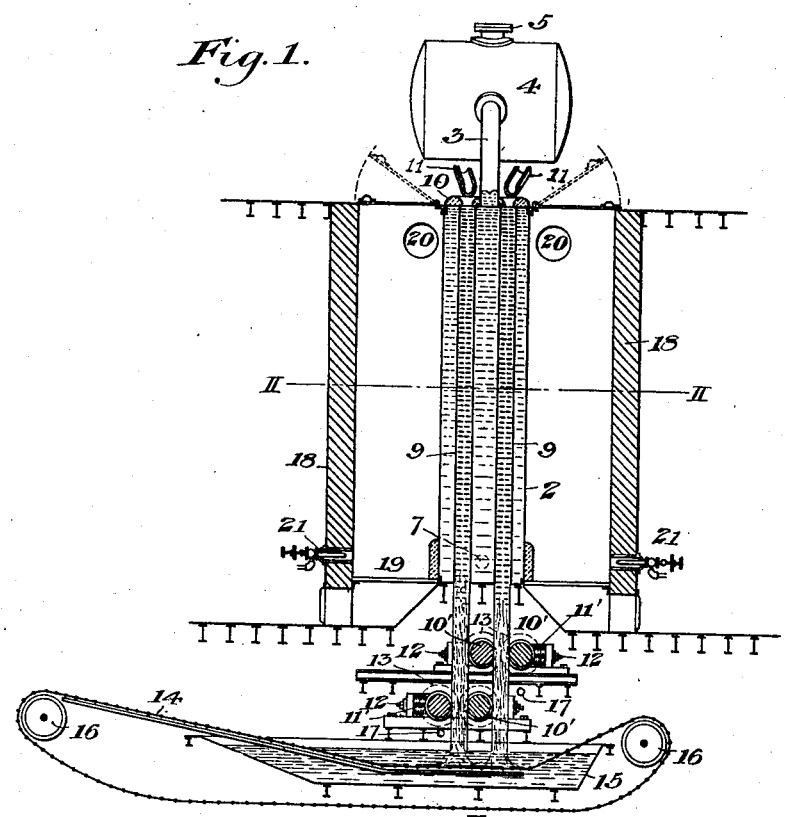
Figure 2:
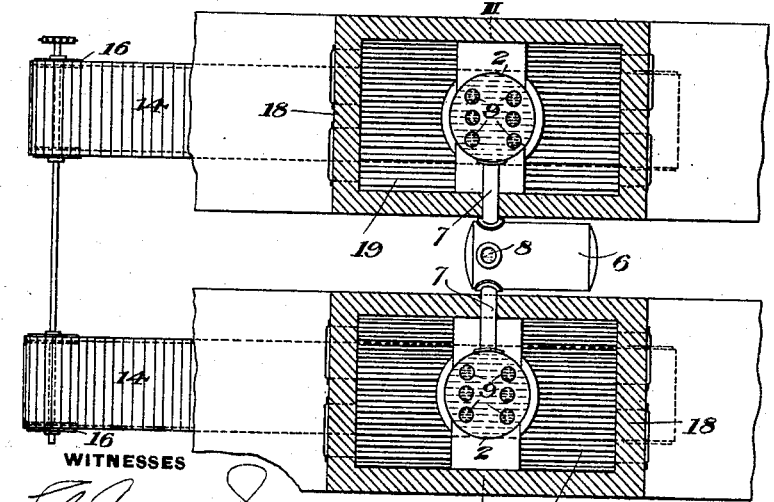
Figure 3:
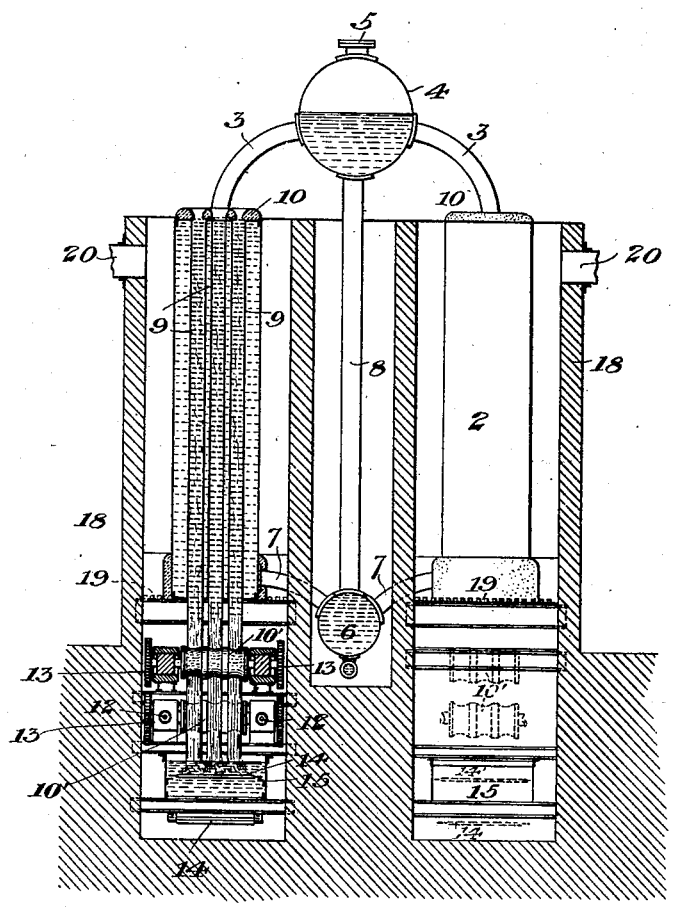

Figure 1 is a side elevation partly in section; Fig. 2 is a horizontal section on the line II—II of Fig. 1; Fig. 3 is a cross-section on the line III—III of Fig. 2.

The slag-heated boiler which I illustrate herein has substantially the same arrangement of boiler-shell and slag-tubes as the slag-boiler described in my Patent No. 746,235, granted on December 8, 1903, and the mechanism which I show for removing the columns of congealed slag from the tubes is substantially the same as that described in my Patent No. 746,239, granted on December 8, 1903. The slag-heated boilers of those patents are heated by molten slag supplied continuously by copper-smelting furnaces, and they have required, heretofore, to be supplemented with an auxiliary boiler plant heated with fuel, in order to furnish power for operating the furnaces at the beginning of their work and during the intervals when they are not producing slag or not producing it in sufficient quantities to generate all the steam that is required.

It is the purpose of my present invention to correct this difficulty and to supply a slag-heated boiler which can be employed alone to generate power for the smelting plant, not only in starting the smelting-furnace in producing its first slag-supply to the boiler, but also at the times when the slag-supply for any reason fails or becomes insufficient.

I show in the drawings upright boiler-shells or cylinders 2, 2, connected by pipes 3, with a steam and water drum or drums 4.

5 is a steam-eduction pipe, and 6 is a mud-drum connected by pipes 7, 7 to the lower portion of the shells and connected by a vertical pipe 8 with the steam and water drum.

The boiler-shells 2, 2, are traversed by upright slag-tubes 9, expanded into the upper and lower end plates. These tubes constitute passages for the slag which is delivered to them at the upper end and is discharged in a solid condition at the lower end of the boiler. The top of each boiler-shell is faced with a refractory lining, preferably a flat tile 10, which is perforated in register with the slag-tubes, so as to prevent injury by the slag to the metal. The boiler-shells themselves are filled from top to bottom with water, which protects the tubes from being burned by the slag.

In operation, the boiler is filled with water up to the water-level in the drum 4, and molten slag is poured into the tubes through spouts 11, either directly from the furnaces or from ladles. In this way the tubes are filled with slag which as it descends solidifies, giving up its heat to the tubes, and thus to the water in the boiler-shell.

Below the slag-tubes and in line therewith are corrugated rollers 10', the bearings of which are forced yieldingly towards each other by springs 11', the pressure being regulated by screws 12, 12. Either or both of these rollers may be driven by any suitable motor through gearing 13. Below the rollers 10' is a conveyer 14, consisting preferably of an endless belt which travels through a water-tank 15 and around sprockets 16, or I may use in place of or as supplemental to the water-tank a pipe or pipes 17, which discharge water upon the slag-column below the rollers.

When the boiler is being operated with slag, the slag-column descends by gravity and is supported by the rollers and is drawn thereby from the boiler in columnar form either continuously at a slow and regulated speed or intermittently, as may be desired, and is delivered to the water in the tank 15 where it is disintegrated, and the fragments are carried by the conveyer 14 into a car or other place of discharge.

The boiler-shells below the steam-drum are inclosed in brick or stone furnace-settings 18, which are provided with grate-surfaces 19, and smoke-flues or stacks 20. The boiler-setting terminates below the upper end of the slag-tubes so as to afford access for the supply of molten slag thereto, and the circulating pipe 8 which connects the steam and water-drum with the mud-drums outside the setting.

In starting the boiler, the furnace is charged with fuel such as wood or coal through the hinged doors on top of the brick or stone work, and the boiler-shell is heated thereby on its outside surface sufficiently to generate steam for the initial operations of the plant. The fire may be discontinued as the supply of slag begins to be received from the furnace and after it has filled the tubes, or it may be used from time to time to supplement the heat derived from the slag.

Where oil fuel is available, as in California, Arizona and Mexico, it may be used advantageously instead of fuel in solid form. For this purpose I may provide the boiler-furnace with a suitable oil-burner 21.

The construction of the slag-boiler may be modified, and the slag-discharging apparatus which I have shown may be replaced with mechanism of other construction, since

What I claim is:

1. A steam generator comprising a setting, a boiler therein having internal and external heating surfaces, means within the setting for heating one of the heating surfaces with heated slag, and means within the setting for burning fuel to heat the other heating surface of the boiler, substantially as described.

2. A steam generator comprising a setting, a boiler therein, means for burning fuel within the setting to exteriorly heat the boiler, and means for passing heated slag through the boiler for interiorly heating the same, substantially as described.

3. A steam generator comprising a setting, an upright boiler therein, means for passing heated slag through the boiler to interiorly heat it, and means for burning fuel in the setting and around the boiler to exteriorly heat the latter, substantially as described.

4. A steam generator comprising a setting, an upright boiler therein provided with open-ended longitudinal heat flues, means for conveying heated slag into the tops of the flues, means for carrying off the discharge of slag from the bottoms of the flues, and means for burning fuel within the setting around the boiler, substantially as described.

5. A steam generator comprising a setting, a boiler therein having open-ended longitudinal heating flues, means for feeding hot slag into the flues at one end of the boiler, means for carrying off the discharge of slag from the other ends of the flues, and means for burning fuel within the setting around the boiler, substantially as described.

6. A steam generator comprising a setting, a boiler therein provided with longitudinal open-ended heating flues, a circulating system connected with the boiler and located externally of the setting, means for feeding heated slag into the flues at one end of the boiler, means for carrying off the discharge of slag from the other ends of the flues, and means for burning fuel within the setting around the boiler, substantially as described.

7. A steam generator comprising spaced upright settings, upright boilers within the settings provided with open-ended longitudinal heating flues, a water and steam drum above the settings and connected to the tops of the boilers, a mud drum between the settings adjacent the lower ends of the boilers, connections between the upper and lower drums and between the lower drum and the boilers, means for feeding heated slag to the upper ends of the heating flues, means for carrying off the discharge of slag from the lower ends of the flues, and means for burning fuel within the settings around the boilers, substantially as described.

8. The combination with a setting, a boiler therein having open-ended heat flues piercing the ends thereof, and means within the setting for burning fuel around the boiler, of means for feeding hot slag into the flues at one end of the boiler, and means for carrying off the slag discharged through the other ends of the flues, substantially as described.

In testimony whereof, I have hereunto set my hand.

RALPH BAGGALEY.

Witnesses:
J. H. REED,
THOMAS W. BAKEWELL.